Aug. 11, 1942.  D. H. MITCHELL  2,292,890
CONVEYER CONTROL
Filed July 5, 1940
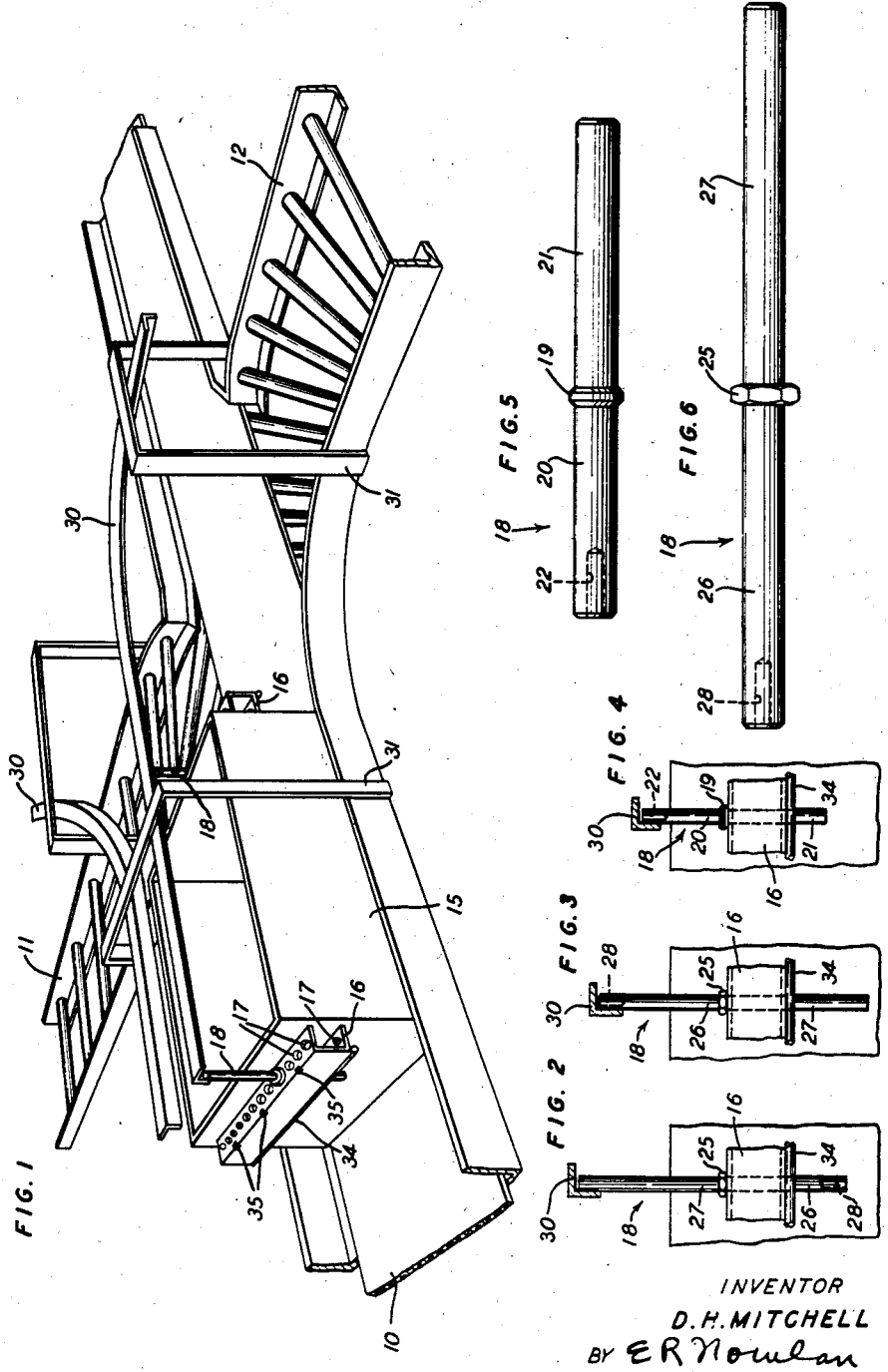
INVENTOR
D. H. MITCHELL
BY E R Nowlan
ATTORNEY Patented Aug. 11, 1942

2,292,890

UNITED STATES PATENT OFFICE 2,292,890

CONVEYER CONTROL

Donald H. Mitchell, Linden, N. J., assignor to Western Electric Company, Incorporated, New York, N. Y., a corporation of New York Application July 5, 1940, Serial No. 343,987

5 Claims. (Cl. 198—38)

This invention relates to conveyer controls, and more particularly to conveyer systems to control the travel of carriers along predetermined selected conveyer routes.

Conveyer systems frequently include a main conveyer line and a plurality of branch lines leading from the main line and from other branch lines, forming routes over which carriers, accurately controlled, may travel. The carriers frequently have a selected one or a pair of controlling members mounted thereon in selected controlling positions, to cause them to travel along their definite routes. The number of routes which may be made available for carriers to travel on depends upon the number of different controlling positions for the controlling members. For example, if like pins are used as controlling members and there are twelve controlling positions across the carrier for the pins, then only twelve routes may be used. The width of a carrier limits the available space for the controlling position and the provision of added controlling positions for added routes, by adding to the outer or inner structure of the carrier, either increases the size of the carrier or reduces its capacity, while in both instances the weight of the carrier is increased, making it more difficult to handle.

An object of the invention is to provide a simple control for conveyers whereby a multiplicity of conveyer routes may be made available with but a small number of controlling positions on carriers.

With this and other objects in view, the invention comprises a carrier for conveyer, having a plurality of routes, having a number of controlling positions and controlling members greater in number than the positions for the selective location of one of a group of controlling members for each position.

Other objects and advantages will be apparent from the following detailed description when taken in conjunction with the accompanying drawing, wherein Fig. 1 is a fragmentary perspective view of a small portion of a large conveyer system illustrating the invention;

Figs. 2, 3 and 4 are fragmentary detailed views illustrating different types of control members at different positions along their respective routes of the conveyer system, and Figs. 5 and 6 are side elevational views of different types of control members.

Referring now to the drawing, attention is directed to Fig. 1, which illustrates a main conveyer 10 and branch conveyers 11 and 12 which are but a small portion of a conveyer system which may be included in the invention. It is not possible to illustrate completely the entire conveyer system and the many routes which may be made available through the aid of the invention, namely the control means, but it is believed that with the structure shown in the drawing the full scope of the invention may be visualized.

Conveyer systems sometimes vary in width, depending upon the size of the articles to be conveyed thereon, but conveyer systems for carriers such as metal trays or baskets which are to be lifted onto and off of the conveyer system manually, are generally of a standard type, slightly wider than the conventional carrier, and the carrier must necessarily be no larger than can be conveniently handled.

Where various routes exist in a conveyor system, a carrier, in order to travel on its respective route without manual assistance, must carry certain controlling members positioned to function with directing elements, positioned at the juncture of the conveyer lines in the respective route, to cause the carrier to change from one line to another. The number of positions for the controlling members depends upon the width of the carriers and when the carriers are limited in width to the width of the conveyer, only a definitely small number of controlling positions may be provided, thus limiting the number of routes available in the conveyer system.

In the present embodiment a carrier 15 is provided with channel for U-shaped members 16 rigidly mounted at each end of the carrier, as shown, by any suitable means such as welding. The members 16 have aligned pairs of controlling positions 17, namely apertures disposed in aligned rows in the legs of the members for receiving controlling members 18. In the present embodiment twelve controlling positions are provided in each member 16. If the twelve controlling members 18 were identical in structure then only twelve routes could be employed in the conveyer system. However, the controlling members 18 are selected from groups varying in length, whereby a plurality of controlling members may be used at each controlling position, multiplying the number of routes in the conveyer system which may be made available, by the number of different sizes of controlling members for each controlling position.

In Figs. 5 and 6 two different types of controlling members, indicated generally at 18, illustrate how four different routes may be made available for each controlling position. Attention is first directed to Fig. 5, which illustrates a controlling member 18 with an identifying portion 19 disposed at a definite position between the ends of the member, providing portions 20 and 21 of different lengths upon each side of the identifying portion. The identifying portion serves two purposes, one to enable an operator to readily determine its particular controlling member from others and another to serve as a stop or rest, limiting the distance the controlling member extends above the carrier when disposed in a selected controlling position. Other identifying means, such as a recess or aperture 22, in one end of the controlling member serves to identify that end, for example, the shorter end portion, from the other so that the operator may select the controlling member by the contour of the identifying portion 19 without visual assistance and select the desired end of that controlling member merely by the sense of touch. The controlling member shown in Fig. 6 has an identifying portion 25 which differs from the identifying portion 19 of the controlling member in Fig. 5, the former having flat sides and being hexagonal or octagonal in general contour while the identifying portion 19 is round. The identifying portion 25 divides portions 26 and 27 of its respective controlling member, these portions being of different lengths from each other and from the portions 20 and 21 of the controlling member in Fig. 5. A similar identifying means, such as recesses or apertures 28 in the end of the portion 26, enables the operator to identify the portion 26 from the portion 27. These particular illustrations shown in Figs. 5 and 6 are but a small number which might be employed to provide any desired number of controlling members for each controlling position on the carrier, to increase the number of routes available in the conveyer system. For example, controlling members differing in length from those shown in Figs. 5 and 6 may be provided with identifying portions of different contours than those shown at 19 and 25 to help the operator to readily distinguish one from the other.

In the present embodiment directing or guiding elements 30 in the form of tracks angular in cross section are supported by suitable frames 31 at the juncture of the various conveyer lines and positioned to cooperate with their respective controlling members to cause a container equipped with the proper controlling members to travel along a definite route. The directing elements are curved to cause movement, through their respective control members, of the carrier from one conveyer line to another. The distance the directing elements are positioned above the conveyer lines depends upon the length of the controlling members, mainly the distance the controlling members extend above the carriers. Therefore, if the main line of the conveyer system has a plurality of branch lines leading from it, each branch line included in a separate route, the directing elements 30 would be disposed various distances from the path of the upper surface of the container, as illustrated in Figs. 2, 3 and 4.

The directing elements 30 are arranged at the junctures of the conveyer line, with their receiving ends disposed in general vertical alignment with their respective controlling positions 17 and at desired distances above the conveyer line, so that only the proper controlling member will engage therewith, allowing shorter controlling elements to pass freely thereby. It is, therefore, possible for the directing elements for the longer controlling members to be positioned near the loading end of the conveyer system and after directing elements for each of the controlling positions have been arranged for the longest controlling members, then another series of directing elements may be arranged for the next longest controlling members, and so on until all of the routes have been provided with directing elements suitable for both portions of the various controlling members. With this arrangement the provision of twelve controlling positions in the members or handles 16 of the carrier makes possible the provision of as many routes in the conveyer system as there are different controlling portions of the various controlling members times the number of controlling positions.

The members 16 of the carrier serve as handles in manually placing the carrier on the conveyer system and removing it therefrom. Bead portions 34 fixed to the under edges of the members 16 assist the operator in handling the carrier. Identifying portions 35 disposed at selected positions on each of the members 16 aid the operator in finding the desired locating position. These identifying portions are in the present instance notches in the members 16 disposed between desired groups of controlling positions.

During the operation of the conveyer the carrier 15 may be disposed upon the conveyer system at the entrance end thereof and supplied with a pair of controlling members to control the movement of the carrier along its definite route. Each controlling member is equipped with two controlling portions disposed upon opposite sides of an identifying portion. The operator may readily determine the proper controlling member merely by the sense of touch, by taking up the controlling member at the identifying portion such as the identifying portions 19 and 25. It is apparent that the operator can readily determine the difference between the round identifying portion 19 and the flat-sided identifying portion 25. Other identifying portions such as round portions with knurled surfaces or identifying portions of different shapes may be readily distinguishable from those shown in Figs. 5 and 6. After the operator selects the proper controlling member he may then select the proper portion of that controlling member through the aid of the identifying recesses 22 or 28 in, for example, the shortest portion thereof. With these identifying means the operator is relieved of the effort of finding the proper controlling member should no identifying means be provided, and is also relieved of the possibility of providing the wrong controlling member which would direct a carrier along a route other than that desired. The identifying portions 19 and 25 further serve in locating the desired portion of the controlling member a definite distance above the carrier for engagement with its proper directing element 30. The other portion of the controlling member is receivable in the apertures or controlling positions 17 during the travel of the carrier. The provision of the two groups of locating positions in the handles of the carrier provides for a pair of controlling members to definitely control both ends of the carriers in their travel through the conveyer system from one conveyer line to another.

The embodiment of the invention herein disclosed is merely illustrative and may be modified and departed from in many ways without departing from the spirit and scope of the invention as pointed out in and limited solely by the appended claims.

What is claimed is:

1. A control for a conveyer system having a plurality of routes for carriers comprising a carrier, a member on the carrier having an aperture, and a plurality of controlling elements having shoulder portions disposed to divide the elements into controlling end portions all of different lengths, each controlling end portion being adapted to be removably connected to the said member by its companion end portion being receivable in the aperture to cause the carrier to travel its respective one of a plurality of routes.

2. A control for a conveyer system having a plurality of routes for carriers comprising a carrier, a member on the carrrier having an aperture, and a plurality of controlling elements having shoulder portions of different identifying contours to divide the elements into controlling end portions all of different lengths, each controlling end portion being adapted to be removably connected to the said member by its companion end portion being receivable in the aperture to cause the carrier to travel its respective one of a plurality of routes.

3. A control for a conveyer system having a plurality of routes for carriers comprising a carrier, a member on the carrier having an aperture, a plurality of controlling elements having shoulder portions disposed to divide the elements into controlling end portions all of different lengths, each controlling end portion being adapted to be removably connected to the said member by its companion end portion being receivable in the aperture to cause the carrier to travel its respective one of a plurality of routes, and means for each element to identify one end portion thereof from the other.

4. A control for a conveyer system having a plurality of routes for carriers comprising a carrier, a member on the carrier having an aperture, a plurality of controlling elements having shoulder portions of different identifying contours to divide the elements into controlling end portions all of different lengths, each controlling end portion being adapted to be removably connected to the said member by its companion end portion being receivable in the aperture to cause the carrier to travel its respective one of a plurality of routes, and means for each element to identify one end portion thereof from the other.

5. A control for a conveyer system having a plurality of routes for carriers comprising a carrier, a member on the carrier having an aperture, and a controlling element of a predetermined length having an integral shoulder portion positioned to divide the element into controlling end portions of different lengths, either one being receivable in the aperture and supported by the shoulder portion to position the other end portion to cause the carrier to travel its respective route.

DONALD H. MITCHELL.